United States Patent
Alharbi et al.

(10) Patent No.: US 11,674,718 B2
(45) Date of Patent: Jun. 13, 2023

(54) WELL COMPLETION CONVERTING A HYDROCARBON PRODUCTION WELL INTO A GEOTHERMAL WELL

(71) Applicant: Saudi Arabian Oil Company, Dhahran (SA)

(72) Inventors: Atallah N. Alharbi, Dammam (SA); Mashari Al-Otaibi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/862,695

(22) Filed: Jul. 12, 2022

(65) Prior Publication Data
US 2022/0341631 A1 Oct. 27, 2022

Related U.S. Application Data

(62) Division of application No. 15/930,824, filed on May 13, 2020, now Pat. No. 11,473,813.

(51) Int. Cl.
*F24T 10/15* (2018.01)
*F24T 10/30* (2018.01)
(Continued)

(52) U.S. Cl.
CPC .............. *F24T 10/15* (2018.05); *F24T 10/30* (2018.05); *F24T 2010/53* (2018.05);
(Continued)

(58) Field of Classification Search
CPC ....... F24T 10/15; F24T 10/30; F24T 2010/53; F24T 2010/56; F24T 10/00; F24T 10/10;
(Continued)

(56) References Cited

U.S. PATENT DOCUMENTS

| | | |
|---|---|---|
| 3,470,943 A | 10/1969 | Huisen |
| 4,597,454 A | 7/1986 | Schoeffler |

(Continued)

FOREIGN PATENT DOCUMENTS

| | | |
|---|---|---|
| CA | 2916811 | 7/2017 |
| CN | 2386178 | 7/2000 |

(Continued)

OTHER PUBLICATIONS

Ten (10) tranlations total, one each provided for each of the foreign references cited above with corresponding foreign patent documents.*

(Continued)

*Primary Examiner* — Mickey H France
(74) *Attorney, Agent, or Firm* — Fish & Richardson P.C.

(57) ABSTRACT

A well completion to convert a hydrocarbon production well into a geothermal well includes flow tubes to transport a working fluid through the well and a heat exchanger at a downhole location coupled to the flow tubes to exchange heat of the formation at the downhole location with the working fluid. A heat exchange fluid surrounds the heat exchanger at the downhole location to be heated by the formation at the downhole location. The heat exchanger heats the working fluid to a state in which the working fluid rises to the surface. At the surface, a power plant uses the heated working fluid to generate work. The working fluid is then cooled and returned to the downhole location to repeat the work generation cycle.

6 Claims, 4 Drawing Sheets

(51) Int. Cl.
*F24T 10/00* (2018.01)
*F28D 1/053* (2006.01)

(52) U.S. Cl.
CPC ....... *F24T 2010/56* (2018.05); *F28D 1/05316* (2013.01); *F28F 2250/08* (2013.01); *Y02E 10/10* (2013.01)

(58) Field of Classification Search
CPC ....... F24T 10/13; F24T 10/17; F28D 1/05316; F28F 2250/08; Y02E 10/10
USPC ................................ 60/641.2, 641.4, 641.5
See application file for complete search history.

(56) References Cited

U.S. PATENT DOCUMENTS

| | | | | |
|---|---|---|---|---|
| 5,372,016 | A | * | 12/1994 | Rawlings ............... F24T 10/30 62/238.7 |
| 6,073,448 | A | * | 6/2000 | Lozada ................. F24T 10/30 60/641.1 |
| 6,150,601 | A | | 11/2000 | Schnatzmeyer et al. |
| 6,978,850 | B2 | | 12/2005 | Sawyer |
| 7,510,031 | B2 | | 3/2009 | Russell et al. |
| 9,777,540 | B2 | | 10/2017 | Downie et al. |
| 2004/0129408 | A1 | * | 7/2004 | Wiggs .................... F24T 10/15 165/45 |
| 2006/0048770 | A1 | | 3/2006 | Meksvanh et al. |
| 2009/0126923 | A1 | | 5/2009 | Montgomery et al. |
| 2010/0288465 | A1 | * | 11/2010 | Stewart ................. F24T 10/40 165/45 |
| 2013/0075057 | A1 | * | 3/2013 | Johnson ............... H05K 7/2059 165/45 |
| 2013/0300127 | A1 | * | 11/2013 | DiNicolantonio ........ F03G 7/04 290/1 R |
| 2013/0333383 | A1 | * | 12/2013 | Schwarck ............... F24T 10/10 165/45 |
| 2014/0116044 | A1 | * | 5/2014 | Sarria ..................... F03G 7/04 60/641.2 |
| 2015/0013370 | A1 | * | 1/2015 | Wiggs .................... F25B 27/00 62/260 |
| 2015/0330670 | A1 | | 11/2015 | Wynn, Jr. |
| 2017/0051580 | A1 | | 2/2017 | Pierce et al. |
| 2019/0154010 | A1 | | 5/2019 | Toews |
| 2020/0011573 | A1 | | 1/2020 | Graham et al. |

FOREIGN PATENT DOCUMENTS

| | | | | |
|---|---|---|---|---|
| CN | 103015899 | | 4/2013 | |
| CN | 206683436 U | * | 11/2017 | |
| EP | 1486741 A1 | * | 12/2004 | ............. F24T 10/15 |
| EP | 1201873 | | 4/2005 | |
| GB | 2483825 | | 3/2012 | |
| JP | 2003014387 A | * | 1/2003 | ............... F24J 3/084 |
| JP | 4602832 B2 | * | 12/2010 | ............... F24J 3/081 |
| JP | 5100219 B2 | * | 12/2012 | |
| JP | 2013108655 A | | 6/2013 | |
| JP | 2013234782 A | * | 11/2013 | ............. F24J 3/085 |
| JP | 2016223270 A | * | 12/2016 | |
| JP | 6609880 B2 | * | 11/2019 | ............. F24T 10/15 |
| WO | WO-9530863 A1 | * | 11/1995 | ........... E21B 36/003 |
| WO | 2012039630 | | 3/2012 | |
| WO | 2013136113 | | 9/2013 | |
| WO | 2018112611 | | 6/2018 | |
| WO | 2018116140 | | 6/2018 | |

OTHER PUBLICATIONS

PCT International Search Report and Written Opinion in International Appln. No. PCT/US2021/031928, dated Aug. 2, 2021, 16 pages.

Mehmood et al., "Potential for heat production by retrofitting abandoned gas wells into geothermal wells," Plos One, 14(8), Aug. 2019, 19 pages.

Sui et al., "Review and investigations of geothermal energy extraction from abandoned petroleum wells," Journal of Petroleum Exploration and Production Technology 9:1135-1147, 2019, 13 pages.

\* cited by examiner

WELL COMPLETION CONVERTING A HYDROCARBON PRODUCTION WELL INTO A GEOTHERMAL WELL

CROSS REFERENCE TO RELATED APPLICATION

This application is a divisional of and claims priority to U.S. patent application Ser. No. 15/930,824, filed on May 13, 2020, the entire contents of which is incorporated by reference herein.

TECHNICAL FIELD

This disclosure relates to generating power from a hydrocarbon production well, particularly, one that has reached or is about to reach its end of life.

BACKGROUND

Hydrocarbons in subsurface reservoirs are raised to the surface, that is, produced, through hydrocarbon production wells drilled through the subterranean zone into the subsurface reservoirs. A subterranean zone includes a formation, a portion of a formation, or multiple formations. The hydrocarbons (for example, petroleum, natural gas, combinations of them) are held under pressure in the subsurface reservoirs. In primary hydrocarbon recovery operations, the pressure is sufficient to drive the hydrocarbons into the hydrocarbon production wells and to the surface. Over time, the pressure decreases necessitating secondary hydrocarbon recovery operations (for example, implementing electrical submersible pumps) or tertiary hydrocarbon recovery operations (for example, involving injection wells). As a hydrocarbon production well nears the end of its life, either no meaningful quantities of hydrocarbons remain for recovery or the cost associated with recovery of the remaining quantities of hydrocarbons is greater than the cost of the hydrocarbons themselves. At such times, the hydrocarbon production well is abandoned, that is, permanently shut in. Even when a hydrocarbon production well nears the end of its life, a temperature of the formation at the bottom hole location of the hydrocarbon production well remains significantly higher than a temperature at a surface of the well.

SUMMARY

This specification describes technologies relating to a well completion converting a hydrocarbon production well into a geothermal well.

Certain aspects of the subject matter described in this disclosure can be implemented as a method in a hydrocarbon production well nearing end of life. After a hydrocarbon production well completion has been removed from within a hydrocarbon production well nearing end of life, a working fluid is flowed from a surface of the hydrocarbon production well to a bottom hole location within the hydrocarbon production well through a subsurface portion of a geothermal well completion installed in the wellbore. The subsurface portion includes an inflow tube configured to flow the working fluid at a first temperature and in a first state from the surface of the well to the bottom hole location within the well. The subsurface portion includes an outflow tube configured to flow the working fluid at a second temperature greater than the first temperature and in a second state different from the first state from the bottom hole location to the surface of the well. The subsurface portion includes a heat exchanger installed at the bottom hole location. The heat exchanger includes an array of tubes fluidically coupled to the inflow tube and the outflow tube. The array of tubes is configured to exchange heat of a formation at the bottom hole location of the hydrocarbon production well with the working fluid to heat the working fluid from the first temperature to the second temperature and to change the working fluid from the first state to the second state. The working fluid at the second temperature and in the second state rises to the surface of the hydrocarbon production well through the outflow tube. At the surface, the working fluid at the second temperature and in the second state is received. A surface portion of the geothermal well completion generates work using the working fluid received at the surface.

An aspect combinable with any other aspect includes the following features. After the hydrocarbon production well completion has been removed from within the hydrocarbon production well and before the subsurface portion of the geothermal well completion has been installed in the hydrocarbon production well, a thermal conductivity of the formation is modified by injecting thermally conductive materials into the formation.

An aspect combinable with any other aspect includes the following features. The heat exchanger is installed in a sealed chamber formed at the bottom hole location after the hydrocarbon production well completion has been removed from within the hydrocarbon production well and before the subsurface portion of the geothermal well completion is installed in the hydrocarbon production well.

An aspect combinable with any other aspect includes the following features. Before the heat exchanger is installed in the sealed chamber, the sealed chamber is filled at least partially with a heat exchange fluid configured to exchange the heat of the formation with the working fluid flowed through the heat exchanger.

An aspect combinable with any other aspect includes the following features. The heat exchange fluid is circulated within the sealed chamber.

An aspect combinable with any other aspect includes the following features. To circulate the heat exchange fluid within the sealed chamber, a circulation fan installed within the sealed chamber is rotated causing the heat exchange fluid to circulate within the sealed chamber.

An aspect combinable with any other aspect includes the following features. The circulation fan is powered by the heat exchange fluid.

An aspect combinable with any other aspect includes the following features. A quantity of the working fluid at the first temperature and in the first stated flowed into the heat exchanger from the surface of the hydrocarbon production well or a quantity of the working fluid at the second temperature and in the second state flowed out of the heat exchanger toward the surface is controlled based on a performance of the heat exchanger.

An aspect combinable with any other aspect includes the following features. To control, one or more sensors coupled to the heat exchanger and installed at the bottom hole location measure fluid properties of the working fluid flowed into the heat exchanger and fluid properties of the working fluid flowed out of the heat exchanger.

An aspect combinable with any other aspect includes the following features. Before performing work using the working fluid received at the surface, the working fluid is heated using a solar thermal energy system included in the surface portion.

An aspect combinable with any other aspect includes the following features. The working fluid in the first state is in a liquid state. The working fluid in the second state is at least partially in a gaseous state.

Certain aspects of the subject matter described here can be implemented as a geothermal well completion. The completion includes a subsurface portion and a surface portion. The subsurface portion is configured to be installed downhole within a hydrocarbon production well within a hydrocarbon production well. The subsurface portion includes an inflow tube, an outflow tube and a heat exchanger. The inflow tube is configured to flow a working fluid at a first temperature and in a first state from the surface of the well to a bottom hole location within the well. The outflow tube is configured to flow the working fluid at a second temperature greater than the first temperature and in a second state different from the first state from the bottom hole location to the surface of the well. The heat exchanger is configured to be installed at the bottom hole location. The heat exchanger includes an array of tubes fluidically coupled to the inflow tube and the outflow tube. The array of tubes is configured to exchange heat of a formation at the bottom hole location of the hydrocarbon production well with the working fluid to heat the working fluid from the first temperature to the second temperature and to change the working fluid from the first state to the second state. The working fluid at the second temperature and in the second state rises to the surface of the hydrocarbon production well through the outflow tube. The surface portion is configured to be installed at a surface of the hydrocarbon production well. The surface portion is configured to receive, at the surface, the working fluid at the second temperature and in the second state, and perform work using the working fluid received at the surface.

An aspect combinable with any other aspect includes the following features. The heat exchanger includes a substantially cylindrical outer housing in which the array of tubes is disposed. The outer housing is constructed and designed to transfer the heat of the formation to the working fluid flowed through the array of tubes.

An aspect combinable with any other aspect includes the following features. The outer housing includes an uphole inlet to which a downhole end of the inflow tube is configured to fluidically couple. The array of tubes includes a first longitudinal tube fluidically coupled to the downhole end of the inflow tube. The first longitudinal tube has a diameter substantially equal to that of the inflow tube. The first longitudinal tube has a length substantially equal to that of the outer housing. The first longitudinal tube is disposed substantially along a longitudinal axis of the outer housing. The array of tubes includes a first transverse tube fluidically coupled to an outlet of the first longitudinal tube. The first transverse tube is oriented transverse to the longitudinal axis of the outer housing. The first transverse tube is configured to divert the working fluid flowed into the outer housing through the first longitudinal tube and in a downhole direction toward a circumferential wall of the outer housing. The array of tubes includes multiple second longitudinal tubes, each fluidically coupled to the first transverse tube and having a diameter smaller than a diameter of the first longitudinal tube. Each second longitudinal tube is positioned nearer to the circumferential wall of the outer housing compared to the first longitudinal tube and is configured to transfer the heat of the formation from the outer housing to the working fluid as the working fluid flows in an uphole direction.

An aspect combinable with any other aspect includes the following features. The completion includes a second transverse tube fluidically coupled to outlets of the multiple second longitudinal tubes. The second transverse tube is configured to collect the working fluid heated to the second temperature and in the second state. The second transverse tube is fluidically coupled to an inlet of the outflow tube to transfer the working fluid from the heat exchanger to the outflow tube.

An aspect combinable with any other aspect includes the following features. A sensor system is configured to be mounted to the heat exchanger and disposed at the bottom hole location. The sensor system is configured to determine fluid properties of the working fluid flowed through the heat exchanger.

An aspect combinable with any other aspect includes the following features. The completion includes a controller operatively coupled to the sensor. The controller is configured to receive the fluid properties determined by the sensor system, determine an operational efficiency of the heat exchanger based on the received fluid properties, and generate flow control signals based on the operational efficiency, the flow control signals representing a quantity of the working fluid to be flowed into or out of the heat exchanger. The completion includes a flow control system operatively coupled to the controller. The flow control system is configured to receive the flow control signals and control a flow of the working fluid into or out of the heat exchanger based on the received flow control signals.

An aspect combinable with any other aspect includes the following features. The surface portion includes a power plant disposed at the surface. The power plant is configured to receive the working fluid at the second temperature and in the second state and generate the work using the received working fluid.

An aspect combinable with any other aspect includes the following features. The surface portion includes a solar thermal energy system disposed at the surface. The solar thermal energy system is configured to harness solar energy to heat the working fluid at the surface before the working fluid is received by the power plant.

Certain aspects of the subject matter described here can be implemented in a hydrocarbon production well nearing end of life. After a hydrocarbon production well completion has been removed from within a hydrocarbon production well nearing end of life, a subsurface portion of a geothermal well completion is installed within the hydrocarbon production well. The subsurface portion of the geothermal well completion includes an inflow tube configured to flow the working fluid at a first temperature and in a first state from the surface of the well to the bottom hole location within the well. The subsurface portion includes an outflow tube configured to flow the working fluid at a second temperature greater than the first temperature and in a second state different from the first state from the bottom hole location to the surface of the well. The subsurface portion includes a heat exchanger installed at the bottom hole location. The heat exchanger includes an array of tubes fluidically coupled to the inflow tube and the outflow tube. The array of tubes is configured to exchange heat of a formation at the bottom hole location of the hydrocarbon production well with the working fluid to heat the working fluid from the first temperature to the second temperature and to change the working fluid from the first state to the second state. The working fluid at the second temperature and in the second state rises to the surface of the hydrocarbon production well through the outflow tube. At the surface, a surface portion of the geothermal well completion is installed. The surface portion is configured to receive the working fluid from the subsurface portion and to perform work using the received working fluid.

An aspect combinable with any other aspect includes the following features. After the hydrocarbon production well completion has been removed from within the hydrocarbon production well and before the subsurface portion of the geothermal well completion has been installed in the hydrocarbon production well, thermally conductive materials are injected into the formation to modify a thermal conductivity of the formation.

An aspect combinable with any other aspect includes the following features. A sealed chamber is formed at the bottom hole location after the hydrocarbon production well completion has been removed from within the hydrocarbon production well and before the subsurface portion of the geothermal well completion is installed in the hydrocarbon production well. Before the heat exchanger is installed in the sealed chamber, the sealed chamber is at least partially filled with a heat exchange fluid configured to exchange the heat of the formation with the working fluid flowed through the heat exchanger.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes technologies related to converting hydrocarbon production wells nearing ends of their lives into geothermal wells using respective geothermal well completions. Normally, after hydrocarbon production declines or ends in a well (that is, the well nears end of life), the well is abandoned. Nevertheless, the subterranean zone through which the well is drilled retains its geothermal properties. Specifically, temperature at a formation at a bottom hole location remains higher than that at the surface of the well throughout the life of the well and even after the well has been abandoned. By installing the geothermal well completion described in this disclosure, heat can be extracted from the bottom hole location to perform work and to generate power at the surface.

As described in detail later, the geothermal well completion includes a surface portion and a subsurface portion. The surface portion includes a power plant, cooling tower, pipes and valves and, in some implementations, an optional solar thermal energy collector. The subsurface portion includes a smart heat exchanger and pipes and valves. In some implementations, working fluid is flowed downhole into the heat exchanger from the surface. In the heat exchanger, the working fluid is heated by a heat exchange fluid (described later) circulating in the bottom hole location. The heated working fluid rises to the surface and is flowed to the power plant which performs work to generate power. In some implementations, the working fluid can be further heated by the solar thermal energy collector before being delivered to the power plant.

Implementing the techniques described in this disclosure enables converting the hydrocarbon production well that is otherwise about to be abandoned into a geothermal well from which power can be generated. Normally, it would be economically unfeasible to drill a well in a subterranean zone solely for use as a geothermal well. Instead, this disclosure describes repurposing a hydrocarbon production well into a geothermal well when the hydrocarbon production well can no longer be used to produce hydrocarbons. In such repurposing, the economic and technological costs are often limited to re-completing the hydrocarbon production well into a geothermal well. Because the temperature of the formation at the bottom hole location of the hydrocarbon production well will remain significantly higher than a temperature at the surface for a long time (for example, for centuries), the repurposed geothermal well can be available as a renewable source of energy for an extended duration of time. Consequently, the geothermal well can serve as a green energy resource. In addition, well abandonment costs, which involves removal of casings, rig time and expensive special cement recipes, can be avoided by implementing the techniques described in this disclosure.

Figure 1:
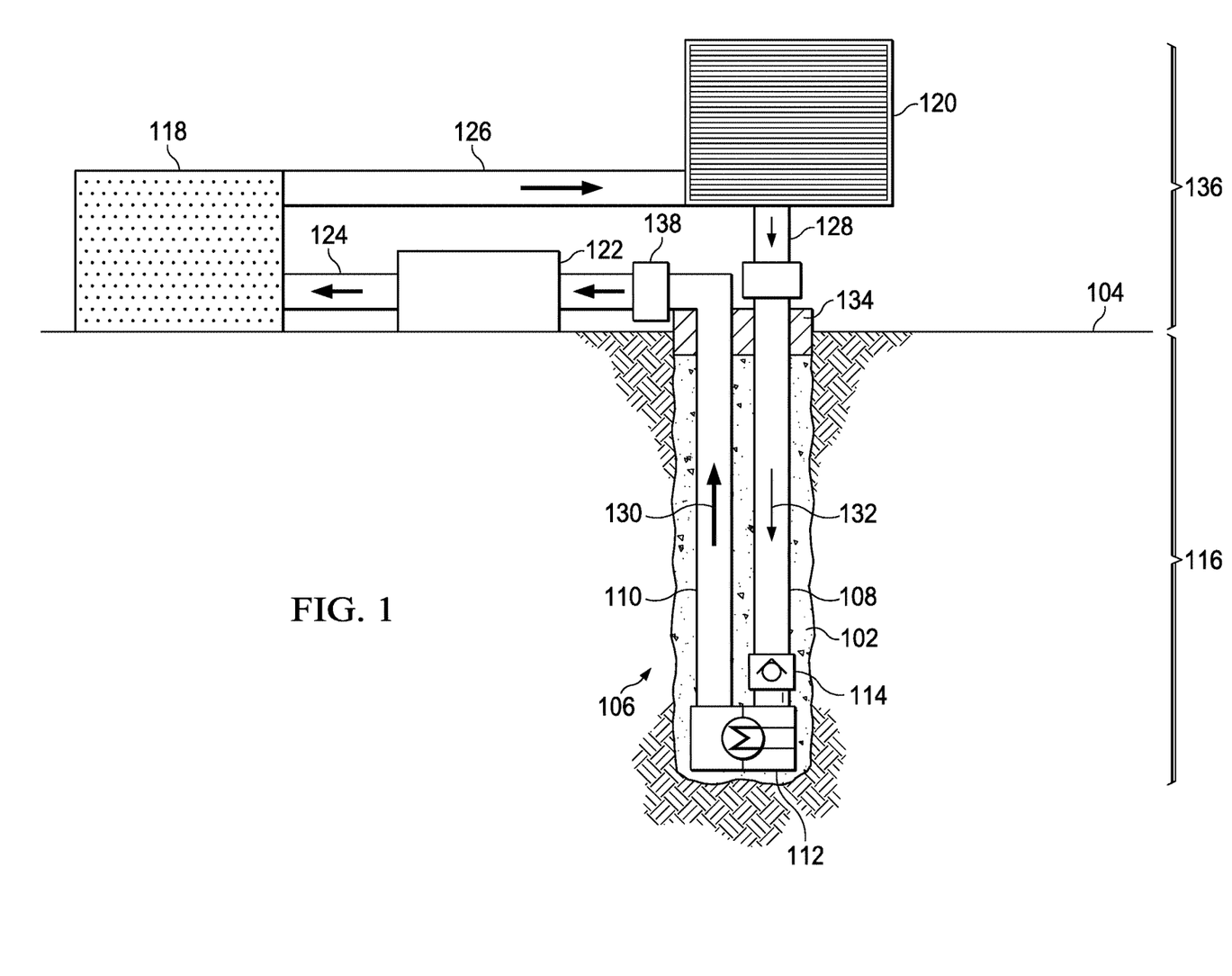
FIG. 1 is a schematic diagram of a geothermal well completion installed in a hydrocarbon production well that is near end of life.

FIG. 1 is a schematic diagram of a geothermal well completion installed in a hydrocarbon production well that is near end of life. The geothermal well completion is deployed in a well 102 extending from a surface 104 of the Earth through a subterranean zone, for example, the formation 106. The geothermal well completion includes a subsurface portion 116 and a surface portion 136. The subsurface portion 116 includes multiple components deployed below the surface 104, whereas the surface portion 136 includes multiple components deployed about the surface 104. The subsurface portion 116 includes an inflow tube 108 configured to flow a working fluid at a first temperature and in a first state from the surface 104 to a bottom hole location within the well 102. The subsurface portion 116 also includes an outflow tube 110 configured to flow the working fluid at a second temperature greater than the first temperature and in a second state different from the first state from the bottom hole location to the surface 104 of the well 102.

For example, the bottom hole location can be a location in the well 102 with the highest temperature, such as the bottom most location within the well 102. In some instances, the temperature at the bottom hole location can be as high as 350° F., while the temperature at the surface is about 80° F. In general, a suitable well temperature depends on the heat exchange fluid and the reservoir thermal conductivity, specifically, an ability of the formation to maintain the temperature. A depth of the well also affects the suitable well temperature because pressure increases with depth and higher temperature is needed at greater depths to phase change a working fluid, for example, to convert water to steam. In some implementations, a well can be filled with filler material (for example, thermally conductive material) to decrease a depth of the well and the geothermal well completion described here can be installed in the well of decreased depth.

A preferred temperature of a well in which water is used as working fluid is at least 212° F. (water boiling temperature). For ethanol and acetone, the preferred temperature is 172° F. and 122° F., respectively. In this context, "preferred temperature" is a temperature to which the heat exchange fluid can be heated. An actual temperature of the formation can be greater than the preferred temperature if the reservoir thermal conductivity is less than 100%. An actual temperature of the formation can be substantially equal to (for example, not more than 5% more than) or exactly equal to the preferred temperature if the reservoir thermal conductivity is 100%. A flow rate at which the heat exchange fluid is circulated within the well can also affect the preferred well temperature.

The working fluid transfers the thermal energy from the bottom hole location to a power plant (described later) included in the surface portion 136. When flowed through the inflow tube 108 toward the bottom hole location (represented by arrow 132), the working fluid has a density sufficient to allow the fluid to flow by force of gravity, that is, high hydrostatic pressure. That is, when flowed through the inflow tube 108, the working fluid is in a liquid state. At the bottom hole location, the working fluid gains heat energy from the formation causing the working fluid to transition from the first state (that is, a liquid state) to a second state (that is, a gaseous or semi-gaseous state) in which the working fluid has a lower density compared to the working fluid in the first state. The working fluid in the second state is also at a second temperature that is greater than the working fluid in the first state and at the first temperature. The working fluid in the second state and at the second temperature then flows toward the surface (represented by arrow 130) through the outflow tube 110. The working fluid can be chosen based on specific conditions of the well and the formation and other parts of the geothermal well completion. For example, if the temperature at the bottom hole location is about 100° F., then a fluid that boils and evaporates at that temperature, such as alcohol, or diesel, can be chosen. If the temperature at the bottom hole location is higher (for example, about 350° F.), then water can be chosen as the working fluid. In general, the working fluid is chemically stable at high and low temperatures of the system and has a heat capacity sufficient to transfer heat from the heat exchange fluid to the working fluid. The working fluid also has a viscosity allowing the fluid to be flowed at high flow rates if the working fluid has low heat capacity.

Each of the inflow tube 108 and the outflow tube 110 can be designed and constructed to flow working fluid from the surface portion 136 through the well 102. The sizes and other properties of the tubes can be chosen to achieve maximum heat exchange from the first temperature to the second temperature and change of state from the liquid phase to the gaseous or semi-gaseous phase. In some implementations, the outflow tube 110 has a larger diameter compared to the inflow tube 108 to allow faster migration of the working fluid at the second temperature and in the second state to the surface portion 136 of the geothermal well completion. In some implementations, each tube can be thermally insulated to prevent heat loss. Examples of thermal insulation include cement, foamed cement, resin cement or similar heat insulating material. In some implementations, the subsurface portion 116 includes a check valve 114 fluidically coupled to the inflow tube 108, for example, nearer to the bottom hole location compared to the surface 104. The check valve ensures that the working fluid flows in only one direction, that is, the downhole direction.

The subsurface portion 116 also includes a heat exchanger 112 installed at the bottom hole location within the well 102. As described later with reference to FIG. 2, the heat exchanger 112 includes an array of tubes fluidically coupled to the inflow tube 108 and the outflow tube 110. The array of tubes is configured to exchange heat of the formation at the bottom hole location within the well with the working fluid to heat the working fluid flowed to the heat exchanger to the inflow tube 108 from the first temperature to the second temperature and to change the working fluid from the first state to the second state. As described earlier, the working fluid at the second temperature and in the second state rises to the surface 104 through the outflow tube 110.

Also, as described earlier, the geothermal well completion includes a surface portion 136 which is connected to the subsurface portion 116. The surface portion 136 is configured to receive, at the surface 104, the working fluid at the second temperature and in the second state, and perform work using the working fluid received at the surface 104. In some implementations, the surface portion 136 includes a power plant 118 (for example, a steam turbine or similar power plant) that can perform the work using the received working fluid. For example, in instances in which the working fluid is water, the power plant 118 can generate power by receiving high pressure steam coming from the well 102. The work performed by the power plant 118 can be converted to electricity, which can then be transferred to a power grid for commercial or residential distribution (or both).

In some implementations, the surface portion 136 includes a solar thermal energy system 122 disposed at the surface 104. The solar thermal energy system 122 is configured to harness solar energy to heat the working fluid at the surface 104 before the working fluid is received by the power plant 118. For example, the solar thermal energy system 122 can include multiple solar collectors that harness heat in sunlight, and transfer the harnessed heat to the working fluid at the second temperature and in the second state from a wellhead 134 to the power plant 118. The solar thermal energy system 122 can further heat the working fluid to a third temperature greater than the second temperature. At the third temperature, the working fluid can be in a phase that optimizes a power generation capability of the power plant 118.

In some implementations, the surface portion 136 includes a condenser 120 (for example, a cooling tower) used to transition the working fluid in the second state to the first state. For example, the power plant 118 is fluidically connected to the condenser 120 to receive the working fluid at the second temperature and in the second state after power generation. The condenser 120 cools the working fluid from the second temperature to the first temperature causing a phase change from a gaseous or semi-gaseous phase to a liquid phase. In some implementations, the condenser 120 can be coupled to other systems that can utilize the heat generated by the condenser 120 when cooling the working fluid. For example, the condenser 120 can be coupled to a water desalination plant that can preheat seawater for desalination purposes. After the working fluid has been flowed through the condenser 120, the working fluid returns to the first temperature and the first state, and can flow to the bottom hole location under gravity. Pumping devices like pumps and compressors can be used to flow fluids through the systems, but the use of such devices is minimized to provide minimal, needed flow assistance or avoided so that the system geothermal well is spontaneous and self-propelled, that is, operable with external motive systems.

The working fluid can be flowed from the wellhead 134 (for example, dual tubing wellhead) to the power plant 118 and from the power plant 118 to the condenser 120 using tubes 124 and 126, respectively. The working fluid exiting the condenser 120 can be flowed into the inflow tube 108 using the tube 128. Each of the tubes 124, 126, and 128 is designed and constructed to flow the working fluid at the first temperature or the second temperature and to the first state or the second state. Like the inflow tube 108 and the outflow tube 110, the tubes 124, 126, and 128 can also be insulated to prevent energy losses.

In some implementations, either the tube 124 or the tube 128 or both can be fluidically coupled to a valve 138. The valves can be used to change the working fluid if required. In addition, the valves can be used in emergency cases, for example, to abandon the well completely, that is, by pumping cement slurry through the entire system. Doing so can ensure that the well does not blowout or that hydrocarbons do not migrate to the surface.

The schematic diagram shown in FIG. 1 shows one geothermal well completion installed in one well. In some implementations, a similar geothermal well completion can be installed in each of multiple wells, which can then be connected to a field-wide working fluid flowline that feeds a bigger power plant, or multiple micro-plants at every well. Work performed and power generated by each well can then be connected to the electricity grid.

Figure 2:
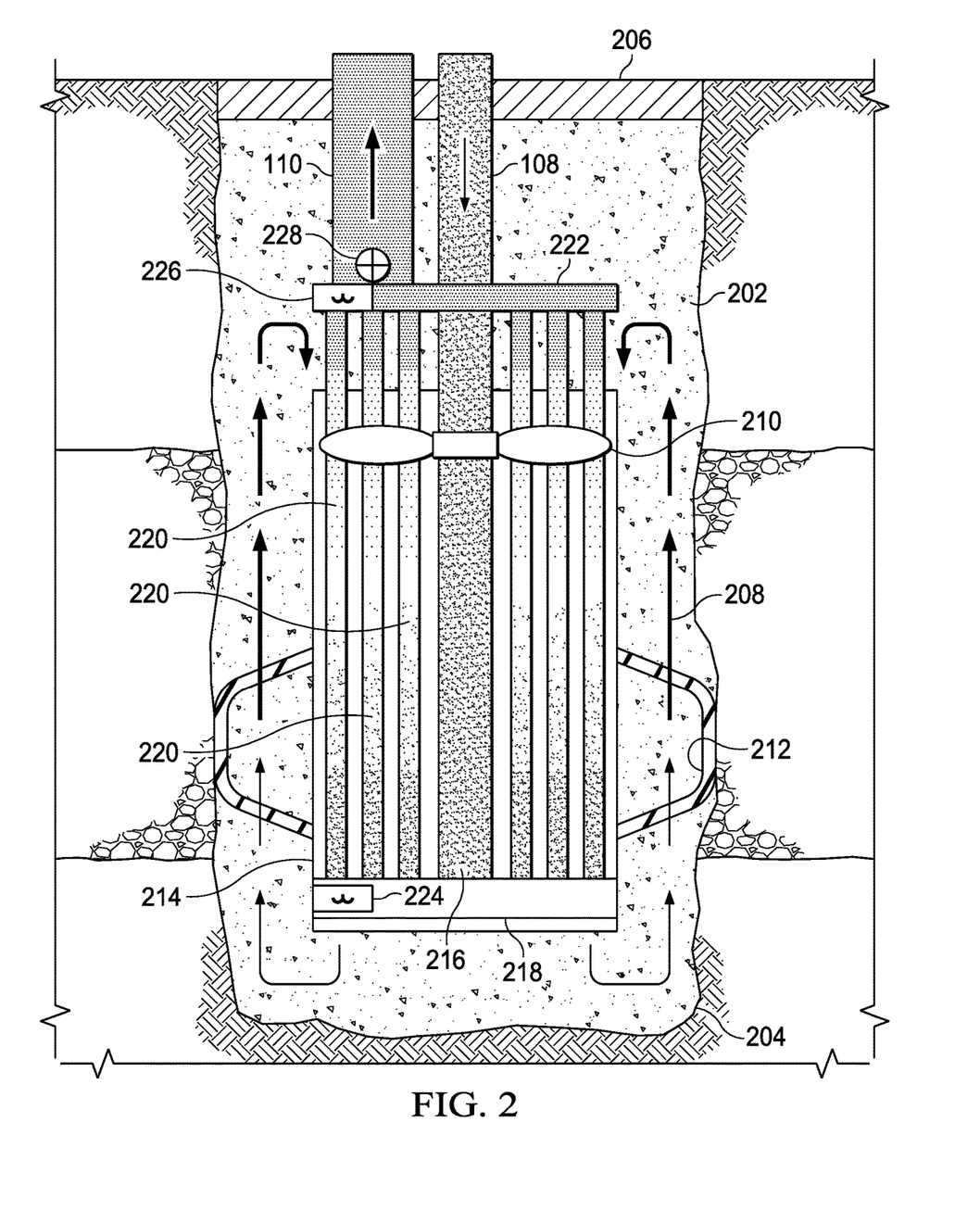
FIG. 2 is a schematic diagram of a subsurface portion of the geothermal well completion of FIG. 1.

FIG. 2 is a schematic diagram of a subsurface portion 116 of the geothermal well completion of FIG. 1. In particular, FIG. 2 shows details of the heat exchanger 112 that transfers heat of the formation at the bottom hole location of the well 102 to the working fluid. When the geothermal well completion is installed in the well 102 (details described later), a sealed chamber 202 is formed at the bottom hole location within the well 102. For example, the sealed chamber 202 is formed by installing a packer 206 or similar sealing member at a height from the bottom of the well 204. Sealing the chamber can prevent hydrocarbons and associated toxic gases from migrating to the surface or migrating to fresh water aquifers. The sealed chamber 202 is filled with a heat exchange fluid, and the heat exchanger 112 is disposed within the sealed chamber 202 surrounded by and directly contacting the heat exchange fluid. Details of the heat exchange fluid are described later.

A portion of the inflow tube 108 and a portion of the outflow tube 110 extend into the sealed chamber 202 and are fluidically coupled to the heat exchanger 112. In some implementations, a circulation fan 210 is installed in the sealed chamber 202 and coupled to the heat exchanger 112. For example, the circulation fan 210 can be mounted to the portion of the inflow tube 108 or the portion of the outflow tube 110. The circulation fan 210 is configured to rotate to circulate the heat exchange fluid within the sealed chamber 202 and around the heat exchanger 112. In some implementations, more than one circulation fan can be implemented. For example, two circulation fans—one about the heat exchanger 112, the other below the heat exchanger 112, both within the sealed chamber 202—can be installed and configured to spin in opposite directions to circulate the heat exchange fluid within the sealed chamber 202 and around the heat exchanger 112. In some implementations, an agitator pump or similar device can be installed in the sealed chamber 202 to circulate the heat exchange fluid. In some implementations, an agitator or a vibrator can be attached to the heat exchanger 212 to keep the heat exchanger continuously moving to cause turbulent vortices directly on the surface to maximize heat exchange efficiency and to remove debris from building on the heat exchanger surface. In some implementations, a centralizer 212 or similar tool is installed around the heat exchanger 112 to form and maintain an annulus between an outer wall of the heat exchanger 112 and an inner wall of the well 102. The annulus ensures that the heat exchange fluid completely surrounds the heat exchanger 112.

In some implementations, the heat exchanger 112 includes an outer housing 214, which is constructed and designed to transfer the heat of the formation to the working fluid, for example, through the heat exchange fluid. For example, the outer housing 214 is a substantially cylindrical pipe having an outer diameter smaller than a diameter of the well 102 and a height shorter than the span of the sealed chamber 202. By "substantially," it is meant that an actual cross-sectional shape of the outer housing 214 can vary from an exact cylindrical shape within manufacturing tolerances of machinery used, to manufacture the outer housing 214. As described earlier, the heat exchanger 112 includes an array of tubes 220 fluidically coupled to the inflow tube 108 and the outflow tube 110. The array of tubes 220 is disposed within the outer housing 214.

The outer housing 214 includes an uphole inlet to which a downhole end of the inflow tube 108 is configured to fluidically couple. Such coupling permits the working fluid at the first temperature and in the first state to be flowed into the heat exchanger 112. The heat exchanger 112 includes a first longitudinal tube 216 fluidically coupled to the downhole end of the inflow tube 108. The first longitudinal tube 216 has a diameter substantially equal to that of the inflow tube 108 and a length substantially equal to that of the outer housing 214. By "substantially equal," it is meant that a dimension of the compared elements can marginally vary from each other so long as a structural integrity of a fit between the compared elements remains intact. In some implementations, the first longitudinal tube 216 is installed substantially along a longitudinal axis of the outer housing 214. That is, a longitudinal axis of the first longitudinal tube 216 and a longitudinal axis of the outer housing 214 are substantially co-linear such that the first longitudinal tube 216 is substantially at a geometric center of the outer housing 214. By "substantially at a geometric center," it is meant that, during installation, the first longitudinal tube 216 is intended to be positioned within the outer housing 214, but minor deviations from the geometric center is acceptable.

The heat exchanger 112 includes a first transverse tube 218 fluidically coupled to an outlet of the first longitudinal tube 216. The first transverse tube 218 is oriented transverse to (that is, perpendicular to) the longitudinal axis of the outer housing 214. The first transverse tube 218 is configured to divert the working fluid is flowed into the outer housing 214 through the first longitudinal tube 216 and in a downhole direction toward a circumferential wall of the outer housing 214. In some implementations, multiple transverse tubes can be implemented in place of or in addition to the first transverse tube 218. Each transverse tube fluidically couples a downhole end of the first longitudinal tube 216 to a downhole end of a respective tube of the array of tubes 220. When the working fluid enters the heat exchanger 112, each transverse tube splits the working fluid into a respective stream or branch and flows the respective stream or branch to a corresponding tube of the array of tubes 220. The transverse tube is chosen to split the flow equally to the array of tubes 220.

The array of tubes 220 includes multiple second longitudinal tubes. Each longitudinal tube is fluidically coupled to the first transverse tube 218 (or to a respective transverse tube), which, in turn, is fluidically coupled to the downhole end of the first longitudinal tube 216, as described earlier. Each longitudinal tube has a diameter smaller than a diameter of the first longitudinal tube 216. Each longitudinal tube is positioned nearer to the circumferential wall of the outer housing 214 compared to the first longitudinal tube 216. Each longitudinal tube is configured to transfer the heat of the formation from the outer housing 214 to the working fluid as the working fluid flows in an uphole direction through the longitudinal tube. By positioning each longitudinal tube as close to the circumferential wall of the outer housing 214 as possible, a distance that a heat flux has to travel from the formation to the working fluid is minimized.

The heat exchanger 112 includes a second transverse tube 222 fluidically coupled to outlets of the multiple second longitudinal tubes. The second transverse tube 222 is configured to collect the working fluid. Because the working fluid has been heated in the multiple second longitudinal tubes, the working fluid collected by the second transverse tube 222 is at the second temperature and in the second state. The second transverse tube 222 is fluidically coupled to an inlet of the outflow tube 110 to transfer the working fluid from the heat exchanger 112 to the outflow tube 110. In some implementations, an outlet of the second transverse tube 222 is offset from a geometric center of the outer housing 214. In the schematic shown in FIG. 2, the second transverse tube 222 is shown as having one outlet that fluidically couples to the outflow tube 110. In some implementations, the second transverse tube 222 can have more than one outlet, each of which fluidically couples to a tubular member, which then couples to the outflow tube 110.

In some implementations, the subsurface portion 136 includes a sensor system 224 configured to be mounted to the heat exchanger 112 and disposed at the bottom hole location within the sealed chamber 202. The sensor system 224 is configured to determine fluid properties of the working fluid flowed through the heat exchanger 112. In some implementations, the sensor system 224 is directly mounted to the circumferential wall of the outer housing 214, for example, at or near the downhole end or the uphole end of the heat exchanger 112. In some implementations, multiple sensor systems are directly mounted to different locations on the circumferential wall of the outer housing 214. Each sensor system 224 can determine (for example, sense) a pressure or temperature (or both) of the working fluid flowing through the heat exchanger 112.

In some implementations, the geothermal well completion includes a controller operatively coupled to the sensor system 224. The controller is configured to receive the fluid properties determined by the sensor system 224 and to determine an operational efficiency of the heat exchanger 112 based on the received fluid properties. For example, based on the pressure or temperature or both sensed by the sensor system 224, the controller can determine if the working fluid has transitioned to the second state and the second temperature necessary for optimal work performance and the power generation by the power plant 118. The controller can generate flow control signals based on the operational efficiency. The flow control signals represent a quantity of the working fluid to be flowed into or out of the heat exchanger 112. In some implementations, the geothermal well completion includes a flow control system 228 operatively coupled to the controller. The flow control system 228 is disposed within the well 102, for example, by fluidic coupling to the heat exchanger 112, the inflow tube 108, the outflow tube 110, or any combination of them. The flow control system 228 is configured to receive the flow control signals and control a flow of the working fluid into or out of the heat exchanger 112 based on the received flow control signals. In some implementations, the controller can be a built-in component of the flow control system 228. In some implementations, the controller can be disposed within the well 102, for example, in the sealed chamber 202, and directly mounted to the heat exchanger 112. Alternatively, the controller can be disposed at the surface 104 and can transmit the flow control signals to the controller via power and data cables run into the well 102. Examples of operations implemented by the controller and the flow control system 228 are described later.

Figure 3:
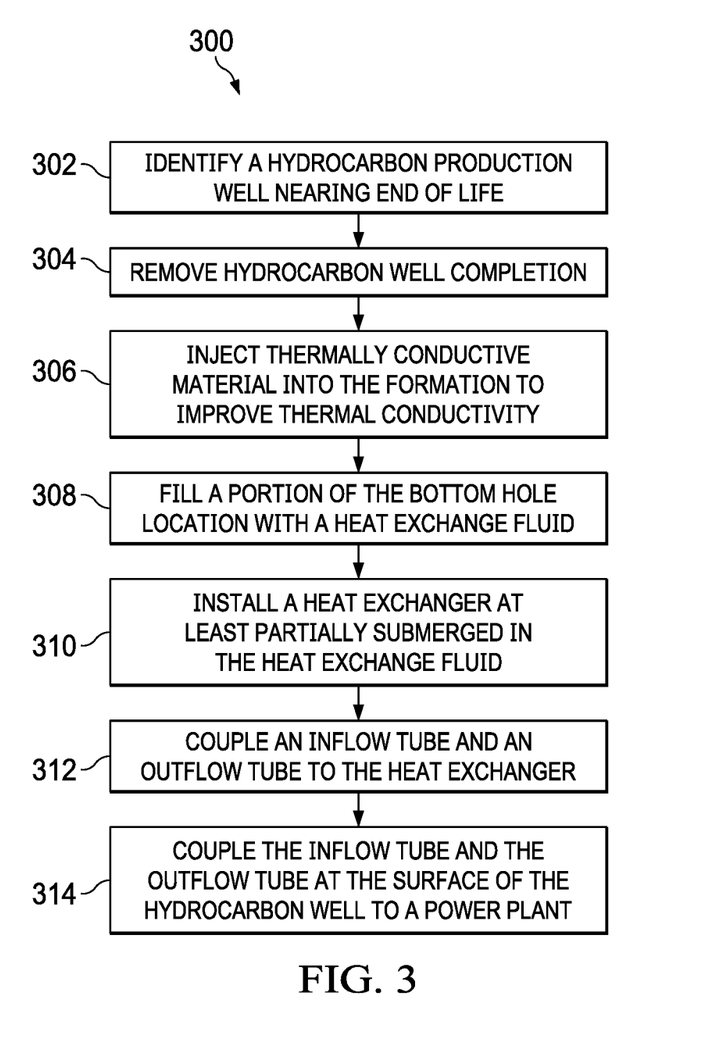
FIG. 3 is a flowchart of an example of a process of installing the geothermal well completion of FIG. 1.

FIG. 3 is a flowchart of an example of a process 300 of installing the geothermal well completion of FIG. 1. The process 300 can be implemented by a well operator. At 302, a hydrocarbon production well nearing end of life is identified. At 304, hydrocarbon well completion, installed within the hydrocarbon production well, is removed.

At 306, a thermal conductivity of the formation is modified by injecting thermally conductive material into the formation. Most formations through which hydrocarbon production wells have been formed have good permeability and porosity that allows the introduction of thermally conductive materials to modify the thermal conductivity of the formation. Examples of thermally conductive materials include hematite (iron rich rock), which can be mixed in drilling mud and pumped downhole. Alternatively or in addition, rocks that conduct heat can be ground and pumped into the reservoir. Ferro-fluids which are iron particles suspended in oil-like fluid can also be pumped downhole into the formation. Brine can also help alter the thermal conductivity. In some instances, the formation can be hydraulically fractured using thermally conductive proppants such as iron proppants (tiny iron beads. In this manner, operations can be implemented to form a highly porous and highly permeable sedimentary reservoir filled with highly conductive fine materials such as metals. Such modification of the thermal conductivity of the formation is implemented before installing the geothermal well completion.

At 308, a portion of the bottom hole location is filled with a heat exchange fluid. In some implementations, a sealed chamber can be formed at the bottom hole location using techniques described earlier, and the sealed chamber can be filled with the heat exchange fluid. The heat exchange fluid has a high thermal conductivity that transfers heat from the formation to the circumferential wall of the heat exchanger. The heat exchange fluid can be any fluid that is clean to prevent corrosion on the heat exchanger after installation. Examples of the heat exchange fluid include filtered brine, diesel, oil, and glycol.

At 310, a heat exchanger is installed at least partially submerged in the heat exchange fluid. In some implementations, the heat exchanger is entirely submerged in the heat exchange fluid so that substantially all of the heat transferred to the heat exchange fluid from the formation can be transferred to the heat exchanger. At 312, the inflow tube and the outflow tube are coupled to the heat exchanger. In some implementations, the heat exchanger can be installed by coupling the heat exchanger to ends of the inflow tube and the outflow tube and running both tubes into the well. In some implementations, the heat exchanger and the packer can be run in with a tool. Then, each tube can be run in separately or together and stung into a receptacle (for example, a polished bore receptacle (PBR)). The PBR has seals to seal around each pipe. In this manner, the subsurface portion of the geothermal well completion is installed. Components of the surface portion of the geothermal well completion are then installed at the surface of the well. At 314, the inflow tube and the outflow tube are coupled at the surface of the well to the power plant and to other components of the surface portion.

Figure 4:
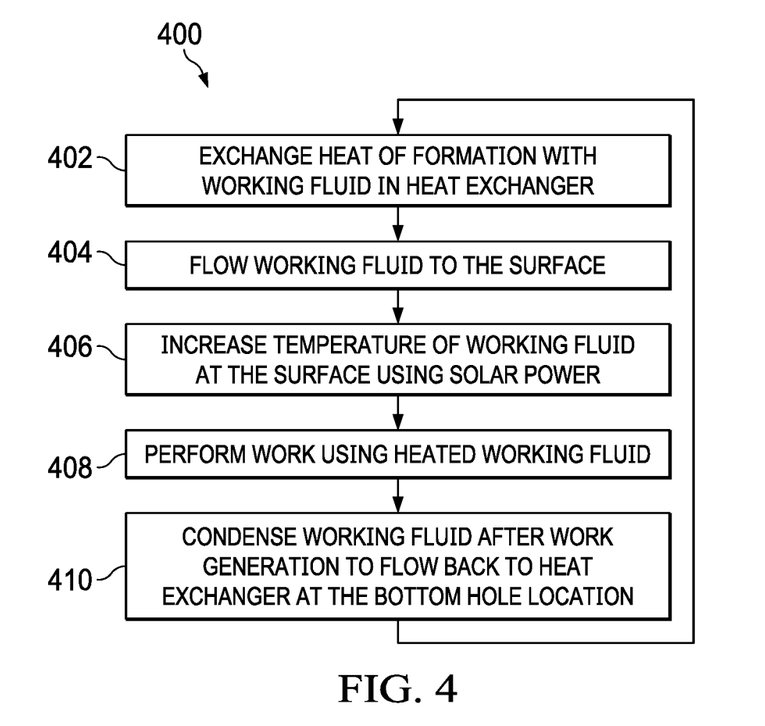
FIG. 4 is a flowchart of an example of a process of performing work from the hydrocarbon production well of FIG. 1 using the geothermal well completion.

FIG. 4 is a flowchart of an example of a process 400 of performing work from the hydrocarbon production well of FIG. 1 using the geothermal well completion. Certain steps of the process 400 are implemented by the subsurface portion of the geothermal well completion, while other steps of the process 400 are implemented by the surface portion of the geothermal well completion.

At 402, heat of the formation is exchanged with working fluid in the heat exchanger. For example, the heat exchange fluid, being in direct contact with the formation, is heated by the heat of the formation. The heat exchange fluid, being in direct contact with the heat exchanger, transfers the heat to the heat exchanger. The circulation of the heat exchange fluid by the circulation fan improves the heat transfer from the formation to the heat exchange fluid, and from the heat exchange fluid to the heat exchanger. The heat exchanger transfers heat from the heat exchange fluid to the working fluid in the array of tubes which are near the circumferential wall of the heat exchanger. The temperature of the working fluid rises causing the working fluid to phase change from a liquid state to a gaseous or semi-gaseous state.

At 404, the working fluid is flowed to the surface of the well. In some implementations, the phase change of the working fluid to the gaseous or semi-gaseous state decreases a density of the working fluid prior to the heat exchange causing the working fluid to rise to the surface without assistance, for example, by a pump or a compressor. In some implementations, the sensor systems determine not only pressure and temperature of the working fluid, but also additional flow parameters such as flow rate of the heat exchange fluid, flow rate of the working fluid in the first state to the inflow tube, and flow rate of the working fluid in the second state in the outflow tube. The sensor system provides the sensed parameters to the controller which determines the second temperature and the second state of the working fluid. If the controller determines that the working fluid has not reached a predetermined temperature threshold, or phase changed sufficiently to the second state, the controller transmits flow control signals to the flow control system. The flow control system includes a network of control valves and chokes fluidically coupled to the inlet tube and the outlet tube. If the flow through the heat exchanger is too fast, the flow sensor system will sense the high flow rate and the resultant low temperature of the working fluid. In response, the flow control system will choke the incoming flow through the inflow tube, allowing the working fluid in the heat exchanger sufficient time for heat exchange. The sensor system can include temperature sensors positioned on (that is, directly coupled to) the formation to determine a temperature of the formation over time using which the controller can determine a thermal conductivity of the formation over time. If the controller determines that the thermal conductivity of the formation has decreased below a predetermined threshold, then the controller can transmit a signal that can alert the well operator. The controller, the flow control system, the sensor system, and any other component installed downhole (for example, the agitator fan) that needs power to operate can be powered by power or data cables run into the well from the surface or using a portion of the working fluid in the second state and at the second temperature within the sealed chamber immediately upon exiting the heat exchanger.

At 406, the temperature of the working fluid at the surface is increased using solar power. Additional heating of the working fluid at the surface using solar power is optional. In some implementations, such solar powered heating can be eliminated or used in a controlled manner based on measuring fluid properties of the working fluid at the surface just prior to the working fluid being flowed into the power plant. At 408, work is performed by the power plant using the heated working fluid flow to the power plant. At 410, the working fluid exiting the power plant is condensed causing the working fluid to return to the first temperature and to the first state (for example, the liquid state). In the first state, the density of the working fluid increases causing the working fluid to flow into the well through the inflow tube under gravity, that is, without assistance from a flow device such as a pump. The process returns to 402 and the heat exchange cycle repeats.

Thus, particular implementations of the subject matter have been described. Other implementations are within the scope of the following claims. In some cases, the actions recited in the claims can be performed in a different order and still achieve desirable results.

The invention claimed is:

1. A geothermal well completion comprising:
a subsurface portion configured to be installed downhole within a hydrocarbon production well, the subsurface portion comprising:
an inflow tube configured to flow a working fluid at a first temperature and in a first state from the surface of the well to a bottom hole location within the well,
an outflow tube configured to flow the working fluid at a second temperature greater than the first temperature and in a second state different from the first state from the bottom hole location to the surface of the well, and
a heat exchanger is configured to be installed at the bottom hole location, the heat exchanger comprising an array of tubes fluidically coupled to the inflow tube and the outflow tube, the array of tubes configured to exchange heat of a formation at the bottom hole location of the hydrocarbon production well with the working fluid to heat the working fluid from the first temperature to the second temperature and to change the working fluid from the first state to the second state, wherein the working fluid at the second temperature and in the second state rises to the surface of the hydrocarbon production well through the outflow tube, wherein the heat exchanger comprises a substantially cylindrical outer housing in which the array of tubes is disposed, the outer housing constructed and designed to transfer the heat of the formation to the working fluid flowed through the array of tubes, wherein the outer housing comprises an uphole inlet to which a downhole end of the inflow tube is configured to fluidically couple, wherein the array of tubes comprises:
a first longitudinal tube fluidically coupled to the downhole end of the inflow tube, the first longitudinal tube having a diameter substantially equal to that of the inflow tube, the first longitudinal tube having a length substantially equal to that of the outer housing, the first longitudinal tube disposed substantially along a longitudinal axis of the outer housing; and
a first transverse tube fluidically coupled to an outlet of the first longitudinal tube, the first transverse tube oriented transverse to the longitudinal axis of the outer housing, the first transverse tube configured to divert the working fluid flowed into the outer housing through the first longitudinal tube and in a downhole direction toward a circumferential wall of the outer housing, wherein the array of tubes comprises a plurality of second longitudinal tubes, each fluidically coupled to the first transverse tube, each having a diameter smaller than a diameter of the first longitudinal tube, each positioned nearer to the circumferential wall of the outer housing compared to the first longitudinal tube, each configured to transfer the heat of the formation from the outer housing to the working fluid as the working fluid flows in an uphole direction; and a surface portion configured to be installed at a surface of the hydrocarbon production well, the surface portion configured to:

receive, at the surface, the working fluid at the second temperature and in the second state, and perform work using the working fluid received at the surface.

2. The geothermal well completion of claim 1, further comprising a second transverse tube fluidically coupled to outlets of the plurality of second longitudinal tubes, the second transverse tube configured to collect the working fluid heated to the second temperature and in the second state, the second transverse tube fluidically coupled to an inlet of the outflow tube to transfer the working fluid from the heat exchanger to the outflow tube.

3. The geothermal well completion of claim 1, further comprising a sensor system configured to be mounted to the heat exchanger and disposed at the bottom hole location, the sensor system configured to determine fluid properties of the working fluid flowed through the heat exchanger.

4. The geothermal well completion of claim 3, further comprising:

a controller operatively coupled to the sensor system and configured to:

receive the fluid properties determined by the sensor system, determine an operational efficiency of the heat exchanger based on the received fluid properties, and generate flow control signals based on the operational efficiency, the flow control signals representing a quantity of the working fluid to be flowed into or out of the heat exchanger; and a flow control system operatively coupled to the controller and configured to:

receive the flow control signals, and control a flow of the working fluid into or out of the heat exchanger based on the received flow control signals.

5. The geothermal well completion of claim 1, wherein the surface portion comprises a power plant disposed at the surface, the power plant configured to:

receive the working fluid at the second temperature and in the second state; and generate the work using the received working fluid.

6. The geothermal well completion of claim 5, wherein the surface portion further comprises a solar thermal energy system disposed at the surface, the solar thermal energy system configured to harness solar energy to heat the working fluid at the surface before the working fluid is received by the power plant.

* * * * *